United States Patent
Ghalaieny et al.

(10) Patent No.: US 12,207,085 B2
(45) Date of Patent: Jan. 21, 2025

(54) METHOD AND SYSTEM FOR AUTHENTICATING A BASE STATION

(71) Applicant: ZARIOT Technologies FZE LLC, Ajman (AE)

(72) Inventors: Dawood Ghalaieny, Belgravia (GB); Jeremy Norris, Portishead (GB)

(73) Assignee: ZARIOT Technologies FZE LLC, Ajman (AE)

( * ) Notice: Subject to any disclaimer, the term of this patent is extended or adjusted under 35 U.S.C. 154(b) by 355 days.

(21) Appl. No.: 17/807,233

(22) Filed: Jun. 16, 2022

(65) Prior Publication Data
US 2022/0408253 A1   Dec. 22, 2022

(30) Foreign Application Priority Data
Jun. 16, 2021   (GB) ..................... 2108548

(51) Int. Cl.
*H04W 12/06* (2021.01)
*H04W 8/18* (2009.01)
*H04W 48/16* (2009.01)

(52) U.S. Cl.
CPC ........... *H04W 12/06* (2013.01); *H04W 8/183* (2013.01); *H04W 48/16* (2013.01)

(58) Field of Classification Search
CPC ... H04W 12/122; H04W 12/06; H04W 12/04; H04W 88/08; H04W 12/12; H04W 8/005; H04W 8/183; H04W 48/16; H04L 63/08; H04L 63/1466
See application file for complete search history.

(56) References Cited

U.S. PATENT DOCUMENTS

| | | | | |
|---|---|---|---|---|
| 6,275,692 | B1* | 8/2001 | Skog | H04W 8/24 455/445 |
| 2006/0014516 | A1* | 1/2006 | Cheng | H04B 1/1615 455/343.1 |
| 2006/0114882 | A1* | 6/2006 | Mills | H04W 4/14 370/352 |
| 2012/0230488 | A1* | 9/2012 | De Los Reyes | H04W 12/069 380/247 |
| 2015/0140997 | A1* | 5/2015 | Goldfarb | H04W 12/122 455/424 |

(Continued)

FOREIGN PATENT DOCUMENTS

WO     2014094822 A1     6/2014

OTHER PUBLICATIONS

Search Report dated Oct. 20, 2022 for foreign counterpart European Patent Application No. 22179334.2.

(Continued)

*Primary Examiner* — Dung Hong
(74) *Attorney, Agent, or Firm* — MLO, a professional corp.

(57) ABSTRACT

A method for authenticating a base station involves a user device sending an authentication request to the base station upon connection to the base station. The authentication request is based on a core network signalling protocol. The user device waits a predetermined amount of time for a response to the authentication request signal and disconnects from the base station if a response is not received or if the response is determined to be inauthentic. The Access Control Class (ACC) of the user device is changed to a different ACC after disconnecting from the base station.

12 Claims, 5 Drawing Sheets

(56) References Cited

U.S. PATENT DOCUMENTS

| | | | |
|---|---|---|---|
| 2016/0277427 A1* | 9/2016 | Deshpande | ......... H04L 63/1416 |
| 2018/0124696 A1* | 5/2018 | Nair | ...................... H04W 12/04 |
| 2018/0146361 A1 | 5/2018 | Jiang | |

OTHER PUBLICATIONS

Search Report dated Mar. 24, 2022 for United Kingdom Patent Application No. 2108548.5.

* cited by examiner

METHOD AND SYSTEM FOR AUTHENTICATING A BASE STATION

RELATED APPLICATIONS

This application claims priority to United Kingdom Non-Provisional Patent Application No. 2108548.5, filed Jun. 16, 2021, all of which is incorporated by reference herein in its entirety for all purposes.

TECHNICAL FIELD

The present application relates to security in radio access networks.

BACKGROUND ART

False Base Station (FBS), Rogue Base Station (RBS), International Mobile Subscriber Identifier (IMSI) Catcher or Stingray. All four of these terminologies refer to a tool consisting of hardware and software that allow for passive and active attacks against mobile subscribers over radio access networks (RANs). The attacking tool exploits security weaknesses in mobile networks.

In mobile networks of all generations, cellular base stations periodically broadcast information about the network. Mobile devices or user equipment (UE) listen to these broadcasting messages, select an appropriate cellular cell and connect to the cell and the mobile network. Because of practical challenges, broadcasting messages aren't protected for confidentiality, authenticity or integrity. The lack of security protection of mobile broadcasting messages and certain unicasting messages makes such attacks possible.

These tools can take various forms, such as a single integrated device or multiple separated components. In the latter form, a false base station or IMSI catcher usually consists of a wireless transceiver, a laptop and a mobile phone. The wireless transceiver broadcasts radio signals to impersonate legitimate base stations i.e., the legitimate base station is cloned. The laptop connects to the transceiver (e.g., via an USB interface) and controls what to broadcast as well as the strength of the broadcasting signal. The mobile phone is often used to capture broadcasting messages from legitimate base stations and feed into the laptop to simplify the configuration of the transceiver. In either form, an FBS can be made compact with a small footprint, allowing it to be left in a location unnoticeably (e.g., mounted to a street pole) or carried conveniently (e.g., inside a backpack).

A false/cloned base station often broadcasts the same network identifier as a legitimate network but with a stronger signal to lure users away. Every mobile phone has the requirement to optimize the reception. If there is more than one base station of the subscribed network operator accessible, it will always choose the one with the strongest signal. Another strategy taken by a false base station is to broadcast the same network identifier but with a different tracking area code, tricking the UE into believing that it has entered a new tracking area, and then switch to the false base station.

Once camped at a false base station and having provided it's IMSI, a UE is subject to both passive and active attacks. In passive attacks, an adversary only listens to radio signals from both the UE and legitimate base stations without interfering with the communication. Consequences from passive attacks include—but are not limited to— identity theft and location tracking. In addition, eavesdropping often forms a stepping stone toward active attacks, in which an adversary also injects signals. An active attacker can be a man-in-the-middle (MITM) or man-on-the-side (MOTS) attacker.

When a UE attaches to a network the IMSI of the SIM card in the UE is sent "in the clear" to the base station prior to any ciphering or encryption being enabled. A number of approaches have been suggested in the art to address this issue. GPP authentication and key generation functions (MILENAGE) have been developed through the collaborative efforts of the 3GPP Organizational Partners. MILENGAGE mitigates such attacks but has been weakened by the use of standardised parameters, C1-C5 and R1-R5.

US 2018/124696 discloses various embodiments for a mobile terminal to confirm authenticity of a base station before the mobile terminal proceeds to camp on the corresponding cell. This prior art document is silent with respect to how to switch to a different base station if a false base station is detected.

US 2012/230488 discloses a method for a terminal to detect a rogue base station. This method relies on sending an encrypted message to the base station.

WO 2014/094822 provides a method of authenticating a public land mobile network (PLMN) to a mobile station (MS). This method is.based on secure ping by SMS or voice call and channel allocation and encryption.

In view of the available prior art, there is a need for improved techniques of preventing such attacks.

SUMMARY

The present teachings relates to a method for authenticating a base station comprising a user device sending an authentication request to the base station upon connection to the base station, wherein the authentication request is based on a core network signalling protocol, the user device waiting a predetermined amount of time for a response to the authentication request signal, disconnecting from the base station if a response is not received or if the response is determined to be inauthentic, and changing the Access Control Class, ACC, of the user device to a different ACC after disconnecting.

The core network signalling protocol may be Mobile Application Part (MAP) or Diameter.

The authentication request may be based on Unstructured Supplementary Service Data, USSD, using MAP signalling.

The response may be determined to be inauthentic if the response indicates that the USSD service is not available.

Optionally, the authentication request is based on encrypted SMS, short message service.

The response may be determined to be inauthentic if a predetermined encrypted SMS response is not received.

The present teachings further comprise connecting to a different base station with an ACC matching the different ACC of the user device.

Optionally, connecting to a different base station comprising issuing a SIM Refresh.

The present teachings further comprise the device displaying a visual message to the user that the base station may be a false base station if the response is not received or if the response is determined to be inauthentic.

The present teachings further comprise the user device requesting user input confirming that the user device should disconnect from the base station.

The present teachings also relate to a user device for authenticating a base station, wherein the user device is configured to perform the steps of the method described herein.

The present teachings also relate to a computer-readable medium comprising instructions which, when executed by a computer, cause the computer to carry out the steps of the method described herein.

BRIEF DESCRIPTION OF THE DRAWINGS

The invention will be further illustrated by the following description of embodiments thereof, given by way of example only with reference to the accompanying drawings, in which.

DETAILED DESCRIPTION OF THE DRAWINGS

The present teachings rely on authenticating the base station to which the user device has connected before the user device will share its IMSI (more specifically the IMSI of the SIM card in the user device).

When a user device connects to a base station or cell tower, it is authenticated by the base station via its IMSI. However, the base station doesn't have to authenticate back. The present teachings introduce the idea of authenticating the base station using radio path signalling or core network signalling.

Figure 1:
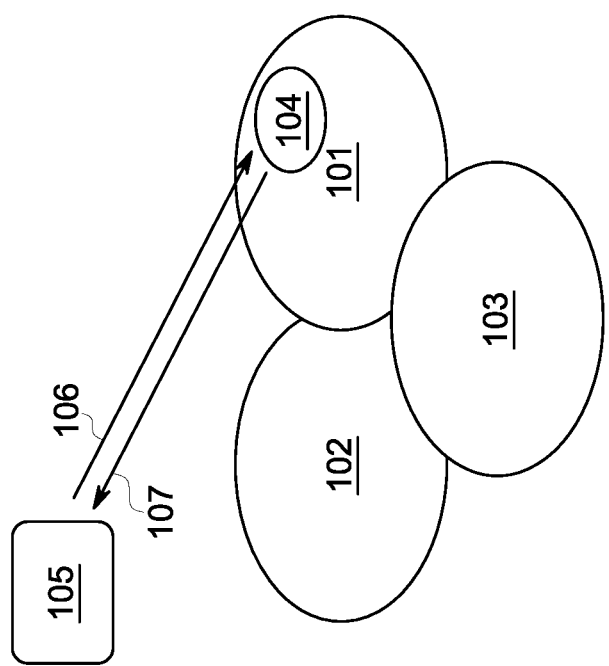
FIG. 1 provides a diagram showing a method of authenticating a base station in accordance with the present teachings.

Turning to FIG. 1, this provides an overview of the approach in accordance with the present teachings.

In FIG. 1, three authentic cells or base stations, 101, 102 and 103, are shown as well as one false base station 104, and a user device 105. The false base 104 could be transmitting at a higher power than the other base stations in order to attract the user device 105. The user device 105 detects the false base station and attempts to connect to it. However, it first sends a signal 106 to the false base station using core network signalling in order to determine if the base station 104 is real or impersonating a base station.

Since false base station 104 is not connected to a real core network it will not be able to respond with the required core network signal 107. That is, signal 107 cannot be sent by the false base station 104. This will indicate to the user device 105 that the false base station 104 is not authentic.

When connecting to any of the authentic base stations, 101, 102 and 103, the user device 105 could also send a core network signal 106 and would receive the corresponding core network signal 107. The receipt of the corresponding core network signal 107 would indicate that base stations, 101, 102 and 103 are authentic. If a base station is determined by the user device to be authentic then the user device 103 will begin communicating with the base station in the usual manner i.e., exchanging packet data etc. The user device 105 may be configured to query the authenticity of a base station only under certain circumstances i.e., if there is a reason to believe a base station may be a false base station.

It is evident from above that the signal 106 sent by the user device to the base station must be a core network signal.

If this signal was packet data it could be manipulated by the false base station. That is, while the false base station will not be able to response with the required core signalling response, it may be able to provide the required packet data response if the query demands packet data. The false base station in configured to mimic the data network but not the core network.

It has been found that MAP or Diameter based signalling are suitable for the core network signalling required by the present teachings. As is known by the person skilled in the art, the Mobile Application Part (MAP) is an SS7 protocol that provides an application layer for the various nodes in GSM and UMTS mobile core networks and GPRS core networks to communicate with each other in order to provide services to users. Diameter signalling is a protocol that enables communication among Internet protocol network elements. It can be thought of as the language that servers and software use to communicate within the core of the LTE network. In IP networks, diameter signalling performs the role that SS7 signalling performs in legacy networks.

In an exemplary embodiment, the use of Unstructured Supplementary Service Data (USSD) to trigger MAP signalling at the user device (subscriber side) has been found to work well. That, is USSD coding in based on MAP and therefore the use of USSD will ensure that a message is delivered in the core network via MAP. However, the present teachings should not be construed as limited to USSD. Short Message Service (SMS) can also be used. As is known to the person skilled in the art, SMS is realised by the use of the Mobile Application Part (MAP) of the SS7 protocol, with Short Message protocol elements being transported across the network as fields within the MAP messages. When using SMS, the SMS content would need to be encrypted. The SMS can be intercepted (by a false base station) but if encrypted and requiring an encrypted response then SMS can support the same functionality. In short, the false base station would not be able to provide the required encrypted response and this would indicate that the base station is malicious.

Other techniques based on core network signalling can also be envisaged by the person skilled in the art.

Figure 2:
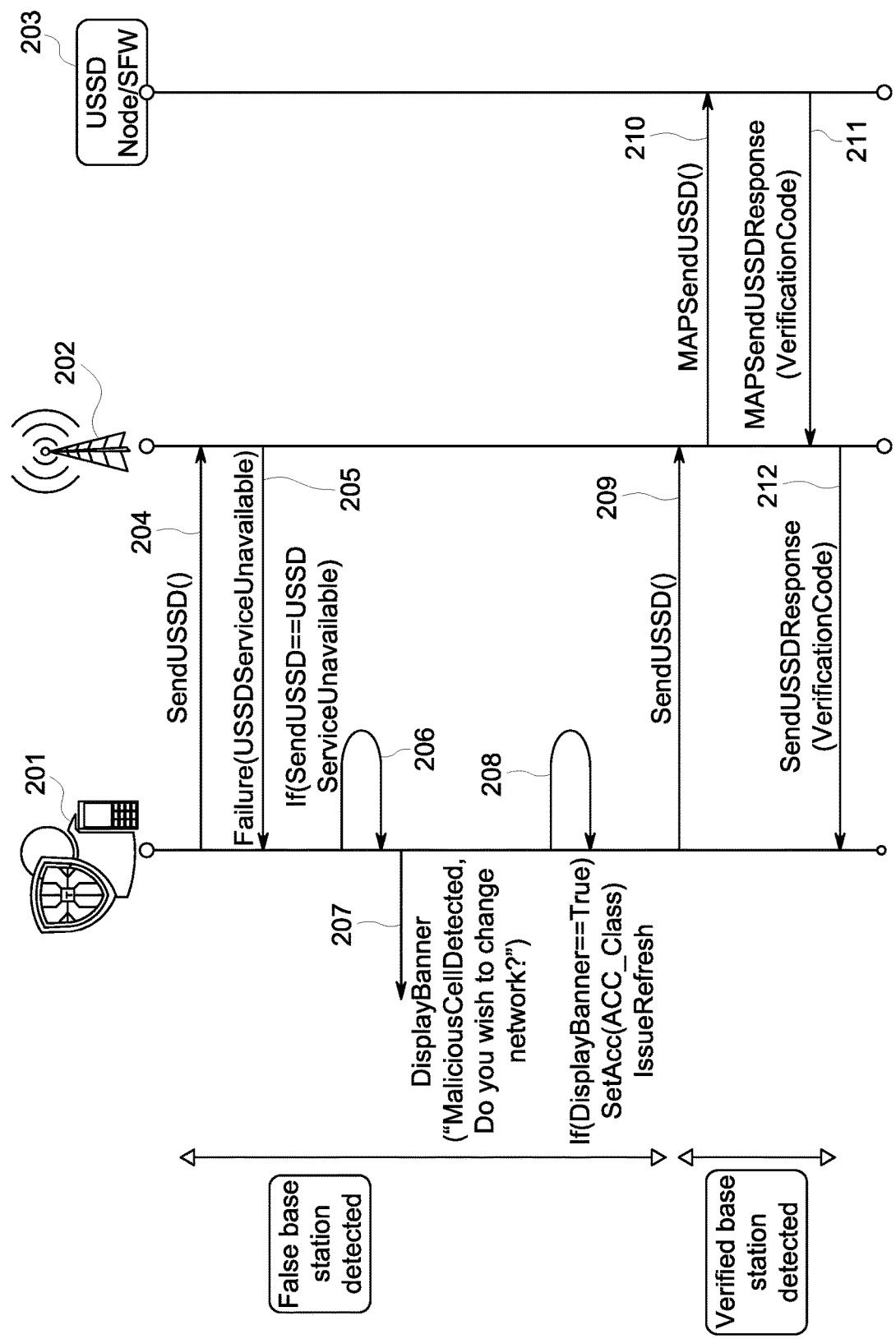
FIG. 2 provides a flow diagram showing the steps of the method of FIG. 1 in more detail.

With reference to FIG. 2, a more detailed explanation of a method of authenticating a base station in accordance with the present teachings is outlined. A user device 201, base station 202 and a core network 203 are shown. It should be appreciated that the base station 202 can represent a false base (unconnected to the core network) or a legitimate base station (connected to the core network 203).

At step 204, a USSD signal or ping is sent to by the user device 201 to the base station 202. It should be appreciated that a USSD ping 204 does not have to be sent every time the user device connects to a base station. It can be limited to being sent to when an unusually high power level is detected from a base station.

At step 205, the user device 201 receives a signal from the base station 202 stating that the USSD service is not available. Alternatively a response to the signal of step 204 may not be received within a specified time period.

At step 206, the user device may determine that the base station 202 is a false base in view of the fact the USSD service is not available or a response signal was not received.

At step 207, the user device 201 displays a warning to the user that the base station may be a false base station and asks if user wants to change networks.

At step 208, the user device receives a user input requesting to change networks. It will be appreciated that this step could happen without user input in that the user device will always try to change networks if it is determined (in step 206) that base station is a false base station. As part of step 208, the user device 201 initiates a procedure to change networks (disconnect from the false base station). This procedure will be explained in more detail later with reference to FIGS. 3 and 4. An alternative to switching networks would be to restrict services such as data (CallControl).

Steps 209-212 of FIG. 2 outline the procedure when the base station 202 is authentic. At step 209 (in the same manner as step 204) a USSD signal or ping is sent to by the user device 201 to the base station 202.

At step 210, the base station sends a signal to the core network 203 seeking a verification response to be sent to the user device.

At step 211, the core network 203 provides the requested verification response. It will be appreciated that this is only possible for a base station 202 that is connected to the core network 203.

At step 212, the verification response is forwarded by the base station.

A specific example of the signalling that could be used to authenticate a base station is outlined below. That is, more details on the specific signals that could be used in the method of FIG. 2 are provided. However, it will be appreciated by the person skilled in the art that the present teachings are not limited to this specific example or the specific signals described. As previously mentioned, the approach described herein can rely on a different core networking signalling protocol, which would involve different signals serving the same purpose.

In the present teachings a SIM/User Device application is used. That is, software is installed on the SIM/User device is used to implement the method of authenticating a base station in accordance with the present teachings. It should also be noted that the network topology remains unchanged with respect to the prior art. The only thing that needs to be done to implement the present teachings in real world situations is the installation of the aforementioned software on the SIM/User device.

In order to install the software on the SIM card, a SIM application or applet may be used. This is a program that runs on the SIM card CPU, separate from the mobile phone. SIM applets are often dedicated to fulfilling a particular task and provide a way to communication directly with the SIM card directly and build features independent from the standard carrier offerings.

When the present teachings rely on the use of USSD, the SIM application detects the location of the subscriber and pings a USSD network node associated with the application. The USSD request uses a Node ID above the range of 100 so a USSD string would look like *USSDNode(100)*<LocationCellID#> or *100*SignedCellID(2341512345)# where 23415 is the global cell ID. The node ID identifies an application in the core network. This application verifies the Cell location and in the USSD response, it indicates in an encrypted form, that the CellID is verified. If the USSD response is not forthcoming i.e. indicating that the nodeB/base station is not connected to a true network or the signed response is not legitimate (i.e. secret key doesn't match), the application on the SIM/Device will reject the network/base station.

Figure 3:
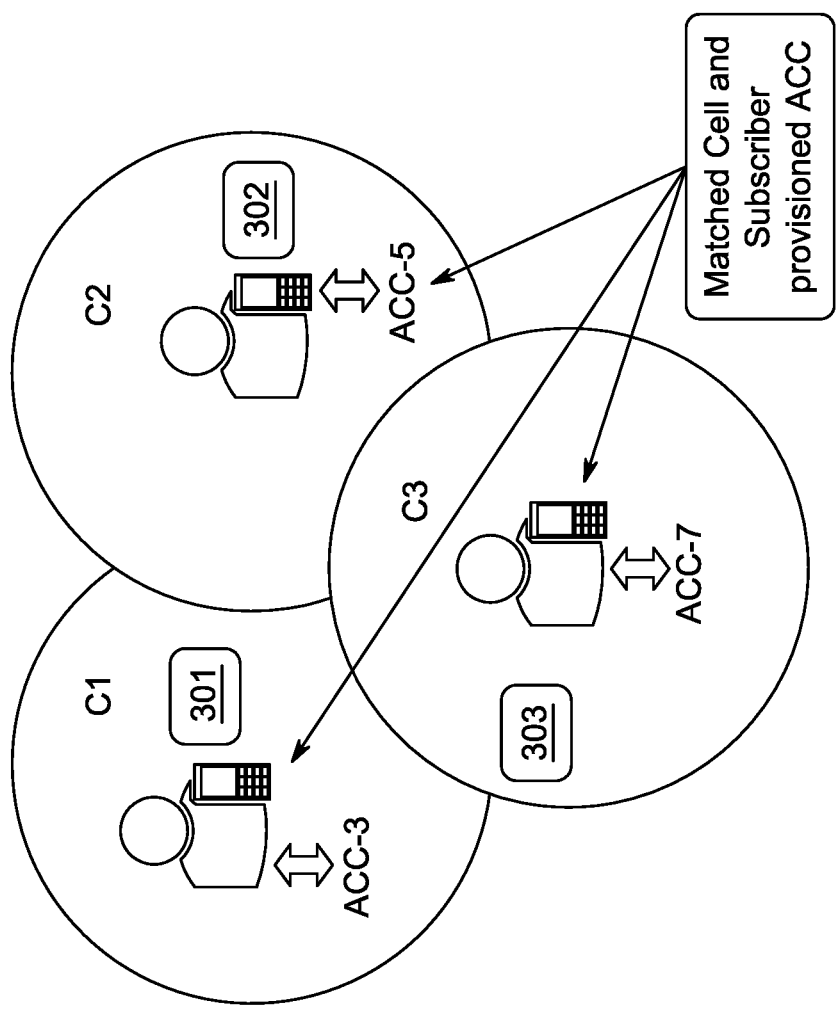
FIG. 3 provides a diagram showing the provisioning and use of Access Control Class in accordance with the present teachings.

Turning to FIG. 3, this provides more detail on the procedure initiated with step 209 of FIG. 2. Once a false base station is detected the user device should disconnect from the false base station and not reconnect. However, this is not straightforward as the user device will continue to try to reconnect to the base station with the highest power, which is likely the false base station. The user device is likely to reselect the same false base station even if the user device is power cycled. It is not possible to bar a cell/base station in MAP, RRC protocols. If an entire network is barred then the user device will be denied service i.e., subscribers will be denied service for which they are paying.

The present teachings rely on ACC (Access Control Class) to stop a user device from reconnecting to a base station/cell, which has been identified as a false base station.

As is known in the art, the ACC is used to control access to a Cell. Specifically, access between a mobile Phone and a network can be controlled through the SIM Card. There is one file inside the SIM named EF ACC 6F78 (Access Control Class) which contains parameters to control this. 15 classes are defined inside this file. The first 10 classes are randomly allocated for normal subscribers, the rest 5 classes are allocated for specific high priority users (Emergency Call, Police Department). (ACCs are allocated randomly usually by taking the last digit of the IMSI, so effectively 0-9). The class allocation is dependent on the requirements of mobile operator.

The ACC is used to cell plan as shown in FIG. 3. In this figure, overlapping cells, C1, C2 and C3 with corresponding base stations are shown. In theory, a subscriber/user device could camp on more than one cell or all user devices could connect to a single cell resulting in congestion. The base stations of each cell, C1, C2 and C3 radiate their respective ACC. For example, cell C1 is broadcasting ACC-3 and therefore only user device 301, which has been provide with ACC-3 can connect to cell C1. The same is true of cells C2 and C3, only user devices using the same ACC as a cell can connect to the cell.

In order to ensure a user device does not reconnect to a cell/base station suspected as being malicious the present teachings rely on changing the user device's ACC, specifically changing the ACC of the SIM in the user device. For example, if C1 is determined to be malicious, the ACC of user device 301 is changed from 3 to 7. The user device is instructed to disconnect from cell C1 (or simply reconnect to some cell). The user device 301 will automatically connect to cell C3 as the ACC of the user device 301 and cell C3 now match. That is, the user device 301 has now switched from the malicious base station of C1 to a legitimate base station of cell C3. The base station of C1 that is malicious has no control over this; it is using standard cell selection methods.

Figure 4:
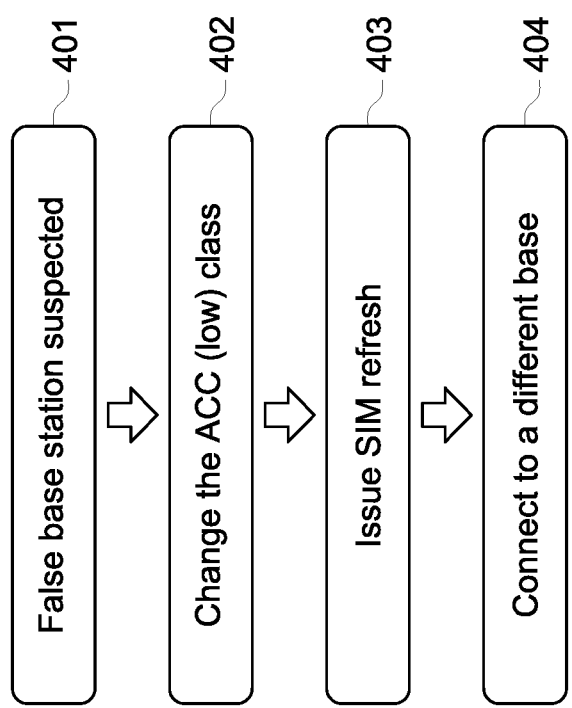
FIG. 4 provides a flow diagram showing the steps involved in ensuring a user device does not reconnect to a malicious (false) base station.

Turning to FIG. 4, this further outlines the steps involved in the process for disconnecting a user device from a false base station and ensuring it does not reconnect to the same base station.

In step 401, it is determined that the base station to which a user device has connected to a false base. For example, the method outlined with respect to FIG. 2 could be used to determine this. However, it should be appreciated that the method with FIG. 4 is independent of the specific method to determine that the user device has connected to a false base.

In step 402, the ACC class of the user device is changed to a different ACC class. Specifically, the aforementioned application on the SIM card (applet) manipulates the EF_ACC on the SIM card.

At step 403, the application Issues a SIM Refresh. This forces a radio bearer re-establishment. As is known to the person skilled in the art, this could be a "REFRESH 00" or "Full File Change Notification".

At step 404, the user device connects to a different base station to the false base station. The new (different) ACC class is used by the user device when it attempts to connect to a base station. That is, the new ACC is used by the device for cell reselection, when the ACC doesn't match the ACC of the rogue cell (false base station), the user device will select an alternative cell location, i.e. be steered away from the rogue cell/base station.

Figure 5:
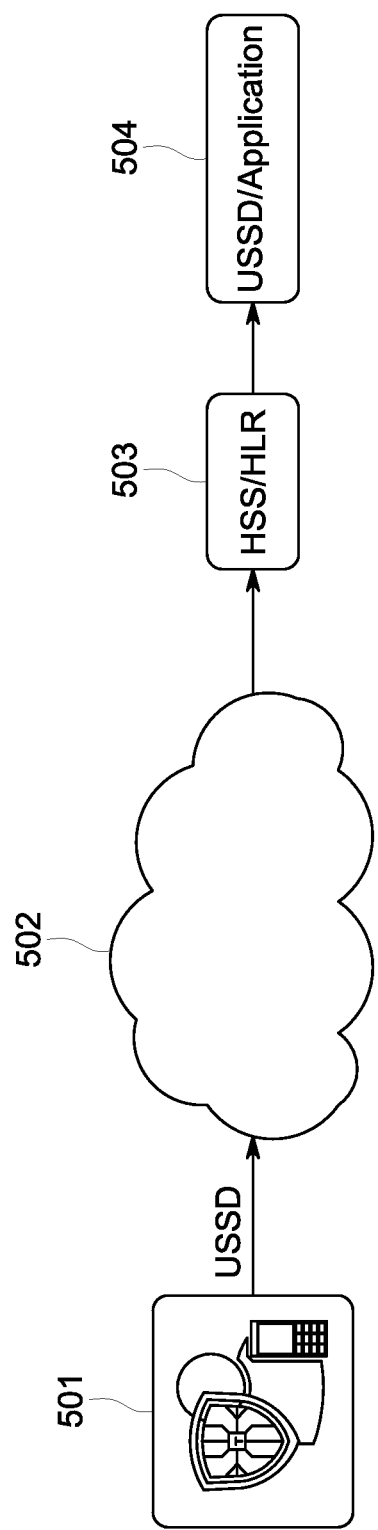
FIG. 5 provides a diagram showing the network topology in accordance with the present teachings.

With respect to FIG. 5, this shows the topology that could be used in the implementation of the present teachings. FIG. 5 outlines the topology when the present teachings rely on USSD to authenticate to a base station.

A User Device/SIM application, 501, communicates with the Access network, 502 (which includes base stations) with respect to USSD. The USSD communications are forwarded to the HSS (Home Subscriber Server) or HLR (Home Location Register) 503 and further forwarded to the USSD/Application 504 (this is an application for processing USSD requests). It will be appreciated that a rogue base station within network 502 does not have access to HSS/HLR 503 or USSD/Application 504.

It should be appreciated that the user device described herein is not limited to a mobile device. Any device using a SIM card is applicable to the claimed teachings.

The base station referred to herein could be the node B (in 3G networks). For discussion of the LTE standard the abbreviation eNB for evolved node B is widely used, and GNodeB for 5G.

It should also be appreciated that the present teachings disclose a computer-readable medium (SIM card) comprising instructions (aforementioned SIM application or applet) which, when executed by a computer, cause the computer to carry out the steps of the methods described herein.

The person skilled in the art should appreciate the fact that the signalling type used by the present teachings, namely core signalling e.g., using direct MAP, cannot easily be intercepted by a false base station.

The present teachings also utilises existing signalling techniques (core signalling) to use the core to verify the base station and not just the user device to verify the base station, which is common in the prior art. In the present teachings. The communication sent by the base station does not have to be encrypted, but only needs to verify a token generated by the SIM application (user device). In essence, the method disclosed herein verifies the subscriber because of known knowledge of the subscriber and verifies the base station using the network and user device and not the other way around, which is always the problem with the other techniques described in the cited prior art documents.

A further problem solved by the present teachings is how to stop the reselection of a currently selected false base station or cell. If for instance a false base station/cell is selected and it is decided to force the user device off this false cell, it is very likely that the user device will reselect the same cell because that cell is chosen by signal strength and quality of service measurements. If it was decided to simply block the cell, that won't work, because the cell is likely to be a clone of a serving (legitimate) cell so this will likely result in blocking a legitimate cell. This is one of the reasons why false base station detection and protection has previously never really been that viable.

The words comprises/comprising when used in this specification are to specify the presence of stated features, integers, steps or components but does not preclude the presence or addition of one or more other features, integers, steps, components or groups thereof.

What is claimed is:

1. A method for authenticating a base station comprising:
   a user device sending an authentication request signal to the base station upon connection to the base station, wherein the authentication request signal is based on a core network signalling_protocol;
   the user device waiting a predetermined amount of time for a response to the authentication request signal;
   disconnecting from the base station if a response is not received or if the response is determined to be inauthentic; and
   changing an Access Control Class (ACC) of the user device to a different ACC after disconnecting from the base station.

2. The method of claim 1, wherein the core network signalling protocol is Mobile Application Part (MAP) or Diameter.

3. The method of claim 1, wherein the authentication request signal is a based on Unstructured Supplementary Service Data (USSD) using MAP signalling.

4. The method of claim 3, wherein the response is determined to be inauthentic if the response indicates that the USSD service is not available.

5. The method of claim 1, wherein the authentication request signal is based on encrypted short message service (SMS).

6. The method of claim 5, wherein the response is determined to be inauthentic if a predetermined encrypted SMS response is not received.

7. The method of claim 1, further comprising connecting to a different base station with an ACC matching the different ACC of the user device.

8. The method of claim 7, wherein connecting to a different base station comprises issuing a SIM Refresh.

9. The method of claim 1, further comprising the user device displaying a visual message to a user that the base station may be a false base station if the response is not received or if the response is determined to be inauthentic.

10. The method of claim 9, further comprising the user device requesting user input confirming that the user device should disconnect from the base station.

11. A system for authenticating a base station, wherein the system comprises one or more machines configured to carry out the steps of the method of claim 1.

12. One or more non-transitory machine-readable media embodying program instructions which, when executed by one or more machines, cause the one or more machines to carry out the steps of the method of claim 1.

* * * * *